Nov. 17, 1931. D. L. JACOBSON 1,831,864
MANUFACTURE OF AMMONIUM CHLORIDE
Filed Oct. 18, 1928
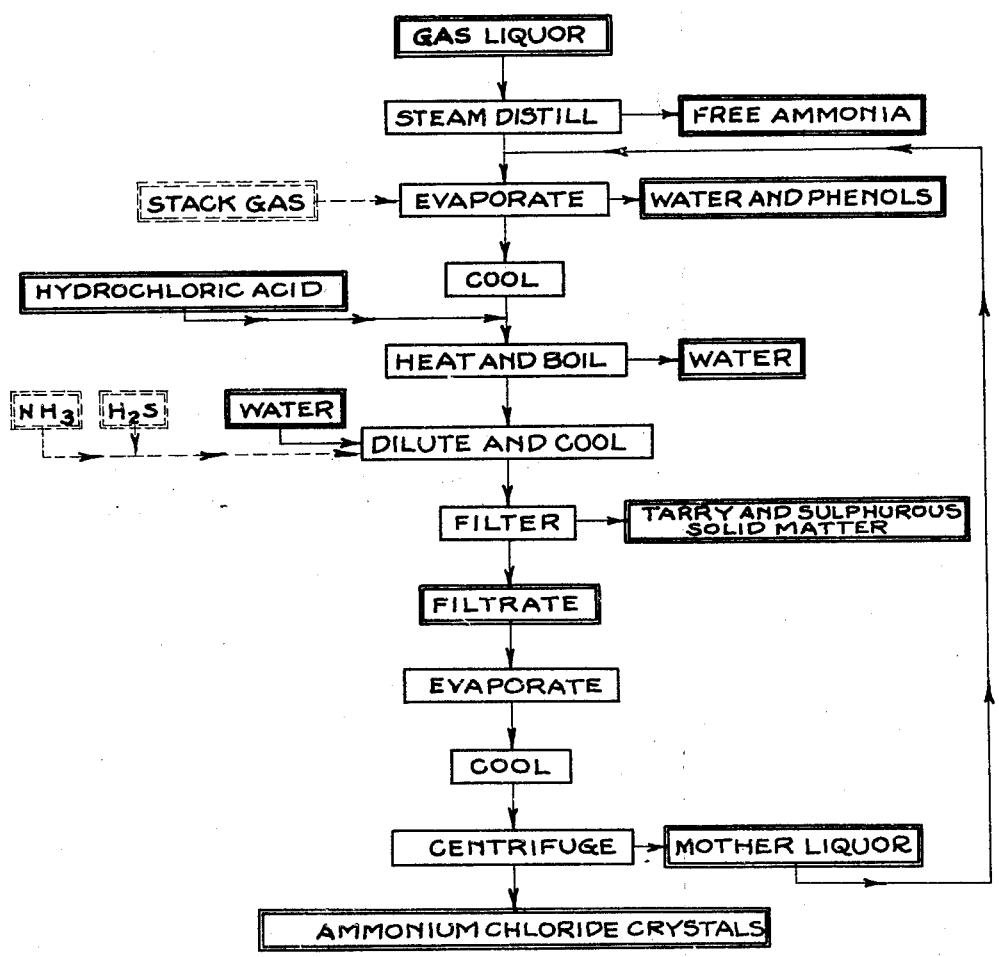
INVENTOR.
David L. Jacobson.
BY Jesse P. Langley
ATTORNEY Patented Nov. 17, 1931

1,831,864

UNITED STATES PATENT OFFICE

DAVID L. JACOBSON, OF PITTSBURGH, PENNSYLVANIA, ASSIGNOR TO THE KOPPERS COMPANY, A CORPORATION OF DELAWARE

MANUFACTURE OF AMMONIUM CHLORIDE

Application filed October 18, 1928. Serial No. 313,303.

My invention relates to the manufacture of ammonium chloride from crude ammoniacal liquor such as gas liquor or the like.

Ammoniacal liquors from gas works or coke oven plants contain, as is well known, in addition to ammonium chloride such undesirable foreign materials as phenols, tarry matter, ammonium thiosulphate and ammonium thiocyanate and the like. In the past no attempts to recover ammonium chloride therefrom have attained to commercial success by reason of the difficulties previously encountered in separating the desired ammonium chloride from the foreign materials also present in the liquor.

An object of my invention is to provide a process of manufacturing ammonium chloride of good color and purity from crude ammoniacal liquors.

A further object of my invention is to provide a process of recovering ammonium chloride from such liquor containing it and thio-compounds, in which said thio-compounds are decomposed to form ammonium chloride and insoluble materials which may be readily separated.

My invention has for its further objects such other operative advantages or results as may hereinafter be found to obtain.

My invention as above stated contemplates the decomposition of ammonium thio-compounds present in the gas liquor with resultant formation of ammonium chloride and insoluble materials, as distinguished from the prior practice of effecting a separation by means of repeated recrystallizations and separations with attendant difficulties and inefficiencies.

In general, my invention further contemplates the recovery of the ammonium chloride initially present in the crude liquor together with small amounts of ammonium chloride formed by the decomposition of thio-compounds also present in the liquid, but ordinarily I do not contemplate the conversion of the free ammonium content of the crude liquor to ammonium chloride, as it is generally true that the cost of reagent necessary to effect such conversion is such as to render the manufacture of ammonium chloride in this manner impractical from an economic standpoint. However, substantially all of the ammonia gas liquors will be primarily removed therefrom in the form of ammonium chloride.

For the above reason I prefer to accomplish the removal of free ammonia from the crude liquor prior to treating the liquor to recover ammonium chloride therefrom. As free ammonia is that ammonia which may be readily decomposed by steam distillation, the removal of the free ammonia is best effected by distilling it with steam. The liquor then contains, in addition to ammonium chloride, the various foreign materials cited above and including principally ammonium thio-compounds.

The gas liquor from which free ammonia has been removed is then concentrated by evaporation, for example, to such a point that when cooled to atmospheric temperature a considerable amount of crystallization occurs.

The evaporation stage may be carried out in any suitable manner as for example by vacuum evaporation. As an alternate procedure, however, stack gas containing carbon dioxide may be passed through the hot ammoniacal liquor, said gases carying off both water and phenols. The phenols may be recovered in any case by any suitable means.

I have discovered that if I add to the mixture of solution and crystals obtained from the evaporation stage a calculated excess of hydrochloric acid and then boil the thereby acidified mixture, the ammonium thio-compounds present are decomposed principally to ammonium chloride. At the same time a clarification from the tarry matter also contained in the crude liquor is effected.

This addition of hydrochloric acid, while it incidentally causes the formation of small amounts of ammonium chloride, is made principally for the purpose of effecting the decomposition of the ammonium thio-compounds which are otherwise very difficult to remove and is to be distinguished from the mere addition of hydrochloric acid to free ammonium compounds for the manufacture of ammonium chloride therefrom.

The resultant mixture is diluted sufficiently to keep ammonium chloride in solution. It is then cooled and filtered to remove tarry and sulphurous solid matter and the filtrate is then evaporated to a point at which, upon cooling to atmospheric temperature, there is obtained a good yield of light colored ammonium chloride crystals of good purity and substantially free from thiosulphates and thiocyanates.

I prefer to concentrate the solution before the acid treatment until it has a boiling point (at atmospheric pressure) of about 112° to 115° C. However, if desired the acid treatment may be carried out in a solution of such concentration that ammonium chloride will not crystallize out when cooling, the purpose here being to avoid a certain amount of final evaporation. Under ordinary circumstances, a solution boiling at 112° to 115° C. contains about 42% by weight of ammonium chloride or roughly about 470 grams per liter of $NH_4Cl$.

The amount of acid added should be slightly more than corresponds molecularly to the ammonium thiosulphate and ammonium thiocyanate. Ordinarily it is sufficient to use about 0.015 lbs. of hydrochloric acid per gallon of ammoniacal liquor containing 3.5 grams per liter of ammonia in a form of fixed compounds, i. e. compounds not decomposed by steam distillation.

The decomposition of the thiosulphate and thiocyanate usually requires from 15 to 30 minutes boiling of the acidified liquor.

As aforesaid the solution is next diluted just enough to keep the ammonium chloride in solution and then filtered. Filter aids such as kieselguhr or any of the various well known gels may be added to improve filtration.

Outside of the acidification stage in which the ammonium thio-compounds are decomposed, the process may be carried out in either acid, neutral or slightly alkaline condition at the option of the operator. For example, after the acidified liquor has been boiled, sufficient ammonia may be added to neutralize any excess acid remaining in the liquor. Moreover hydrogen sulphide either as such or in the form of ammonium sulphide may be added to precipitate iron as iron sulphide. The filtration is then carried out as before.

In case the solution before the final evaporation stage still retains a dark color it may be treated in any suitable manner for the removal of this color; for example, by passing it through a tower containing decolorizing charcoal, fuller's earth or other decolorizing agent.

The separation of the crystals from the evaporated and cooled liquor may be effected by centrifuging or any other suitable means. The mother liquor removed at this point is preferably returned to an earlier point in the process, for example the initial evaporation stage, so as to go through the acid treatment again for the recovery of any valuable material therefrom.

The accompanying flow sheet illustrates diagrammatically the manner of carrying out the process.

While the bulk of the tarry matter is separated in the filtration stage, certain amounts of tarry matter may coagulate at various stages of the process and it is desirable to skim off or in any other way remove said tarry matter wherever it coagulates.

In the acid boiling stage, if the mixture becomes too concentrated, a little water may be added to make up for evaporation.

As an alternate procedure, the initial evaporation stage may be carried to such a point that crude crystals are obtained and separated. These crystals may then be treated with a little water and a calculated amount of hydrochloric acid, boiled to decompose thio-compounds, and the rest of the procedure may be carried out as before.

An example of the specific application of my method is as follows:—100 gallons of coke oven ammonia liquor from which free ammonia has been distilled and containing 2.2 grams per liter of ammonium thiosulphate, 3.17 grams per liter of ammonium thiocyanate and 7.8 grams per liter of ammonium chloride were evaporated to a boiling point of approximately 112° C. and allowed to cool. Upon cooling, a certain amount of crude crystals separated out. To this mixture was added 0.4 gallons of 35% hydrochloric acid, the acidified mixture was then heated to 90° C. for 15 to 20 minutes, and then boiled for about 15 minutes. The mixture was then diluted and cooled and filtered cold to remove solid matter.

The solution having a reddish color was then warmed and filtered through decolorizing charcoal. The filtered solution was then evaporated to a boiling point of approximately 115° C., cooled and centrifuged. Upon centrifuging there was obtained a yield of approximately 3 lbs. of light colored ammonium chloride crystals substantially free from thiosulphates or thiocyanates. About 1.1 to 1.3 gallons of mother liquor were also recovered.

While I have described my invention with respect to the treatment of the ordinary weak ammonia liquor obtained in a gas plant it may be applied to a more concentrated ammoniacal liquor such for example as gas liquor obtained when the hot coal gas is only partially cooled and the condensate formed is relatively rich in fixed ammonia salts.

My invention is not limited to the specific example recited hereinabove by way of illustration, but may variously be embodied within the scope of the claims hereinafter made.

I claim as my invention:

1. The process of recovering ammonium chloride from gas liquor which comprises subjecting the liquor to distillation to remove free ammonia therefrom, boiling the liquor with hydrochloric acid to decompose ammonium thio-compounds, removing the solid products of decomposition formed thereby, evaporating the thereby clarified liquor to cause the formation of crystals of ammonium chloride and removing said crystals from the liquor.

2. The process of recovering ammonium chloride from gas liquor which comprises subjecting the liquor to steam distillation to remove free ammonia therefrom, boiling the liquor with hydrochloric acid to decompose ammonium thio-compounds, removing the solid products of decomposition liberated thereby, and evaporating the thereby clarified liquor to cause the separation from the liquid phase of ammonium chloride crystals, removing said crystals, and returning the mother liquor to a point in the process prior to the treatment of the liquor with the acid.

3. The process of recovering ammonium chloride from gas liquor which comprises treating the liquor to eliminate free ammonia therein, treating the liquor with hydrochloric acid to decompose thio-compounds, removing solid products of decomposition formed thereby, evaporating the thereby clarified liquor to cause the separation from the liquid phase of ammonium chloride crystals, and removing said crystals.

4. The process of recovering ammonium chloride from gas liquor which comprises treating the liquor to eliminate free ammonia therein, treating the liquor with a stream of hot gas, whereby the liquor is concentrated and phenols are removed, treating the concentrated liquor with hydrochloric acid to decompose thio-compounds, removing solid products of decomposition formed thereby, evaporating the thereby clarified liquor to cause the separation from the liquid phase of ammonium chloride crystals, and removing said crystals.

5. In the process of recovering ammonium chloride from gas liquor, the steps which comprise distilling the liquor to remove free ammonia therefrom, and then boiling the distilled liquor with an excess of hydrochloric acid to decompose fixed ammonium compounds other than ammonium chloride.

6. In the process of recovering ammonium chloride from an ammoniacal liquor containing ammonium chloride and other fixed ammonium compounds but substantially no free ammonia, the step which comprises boiling the liquor with an excess of hydrochloric acid to decompose said fixed ammonium compounds other than ammonium chloride.

In testimony whereof, I have hereunto subscribed my name this 16th day of October, 1928.

DAVID L. JACOBSON.